United States Patent
Kudo et al.

(10) Patent No.: US 6,699,956 B2
(45) Date of Patent: Mar. 2, 2004

(54) HIGHLY DIELECTRIC ADDITION TYPE CURABLE COMPOSITIONS

(75) Inventors: Muneo Kudo, Gunma-ken (JP); Masaaki Yamaya, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 16 days.

(21) Appl. No.: 10/096,590

(22) Filed: Mar. 14, 2002

(65) Prior Publication Data

US 2002/0198319 A1 Dec. 26, 2002

(30) Foreign Application Priority Data

Mar. 14, 2001 (JP) ........................................ 2001-071761

(51) Int. Cl.$^7$ .............................................. C08G 77/08
(52) U.S. Cl. .............................. 528/15; 528/31; 528/32
(58) Field of Search ............................... 528/15, 31, 32

(56) References Cited

U.S. PATENT DOCUMENTS

| | | | | |
|---|---|---|---|---|
| 4,123,472 A | * | 10/1978 | Getson et al. ................. | 528/26 |
| 4,618,639 A | * | 10/1986 | Takahashi et al. ........... | 524/262 |
| 4,670,531 A | * | 6/1987 | Eckberg ....................... | 528/15 |
| 4,840,693 A | * | 6/1989 | Suzuki et al. ................ | 156/329 |
| 4,843,517 A | | 6/1989 | Maruyama et al. | |
| 5,256,480 A | * | 10/1993 | Inoue et al. ................. | 428/331 |
| 5,563,203 A | * | 10/1996 | Yoshino et al. ............. | 524/493 |
| 6,365,280 B1 | * | 4/2002 | Schlueter et al. ........... | 428/447 |

* cited by examiner

Primary Examiner—Margaret G. Moore
(74) Attorney, Agent, or Firm—Birch, Stewart, Kolasch & Birch, LLP

(57) ABSTRACT

A highly dielectric addition type curable composition is provided comprising (A) an organopolysiloxane containing a cyanoalkyl group and a monovalent hydrocarbon group having an aliphatic unsaturated bond, (B) an organohydrogenpolysiloxane containing a cyanoalkyl group, and (C) a platinum group metal catalyst. The composition is easy to handle because of liquid despite solvent-free, less hygroscopic and effectively curable, and has a film-forming ability. The cured composition has excellent dielectric properties as demonstrated by a large dielectric constant and a low dielectric loss.

6 Claims, No Drawings

HIGHLY DIELECTRIC ADDITION TYPE CURABLE COMPOSITIONS

This invention relates to highly dielectric addition type curable compositions which are less hygroscopic and able to form films and cure into products having improved dielectric properties including a large dielectric constant and a low dielectric loss and finding practical use in a variety of applications.

BACKGROUND OF THE INVENTION

Engineers have made efforts to ameliorate the performance of electric and electronic parts such as electroluminescent devices and film capacitors while reducing the size and weight thereof. As the dielectric material used therein, organic polymers having a large dielectric constant are of interest and have been used. It is believed that this trend becomes increasingly prevalent in the future.

The dielectric organic polymers which are known in the art include cyanoethyl polysaccharides such as cyanoethyl cellulose, cyanoethyl starch and cyanoethyl pullulan, cyanoethyl polysaccharide derivatives such as cyanoethyl hydroxyethyl cellulose and cyanoethyl glycerol pullulan, cyanoethyl polyols such as cyanoethyl polyvinyl alcohol, and fluoro-resins such as polyvinylidene fluoride.

However, these substances have many drawbacks and do not perform satisfactorily when applied in electric and electronic fields. More particularly, cyanoethyl products of polysaccharides and polysaccharide derivatives and cyanoethyl polyvinyl alcohol have the common drawback that they are highly hygroscopic and readily alter electrical properties by moisture absorption, sometimes detracting from the reliability of electric and electronic parts. This phenomenon can be prohibited by taking such measures as careful control of humidity during the manufacturing process and removal of absorbed water. These measures, however, are regarded negative from the productivity standpoint and hardly expected to exert satisfactory effects.

Also undesirably, cyanoethyl cellulose and cyanoethyl starch are difficult to form film. Cyanoethyl hydroxyethyl cellulose, cyanoethyl glycerol pullulan, and cyanoethyl polyvinyl alcohol undergo large changes of dielectric constant with temperature.

The fluoro-resins such as polyvinylidene fluoride have the advantages of a low moisture absorption and reduced changes of dielectric constant with temperature, but their dielectric constant is approximately half of that of cyanoethyl polysaccharides and polysaccharide derivatives.

U.S. Pat. No. 4,843,517 discloses a highly dielectric organic material base on a cyanoalkyl group-bearing organopoly-siloxane. This is semi-solid or solid and difficult to handle in forming a film. Such difficulty can be avoided by dissolving the material in polar solvents such as acetone and dimethylformamide. However, the solutions are not applicable to various organic resin substrates because the substrates can be attacked by the solvents. The applicable substrates are thus restricted.

SUMMARY OF THE INVENTION

An object of the invention is to provide a highly dielectric addition type curable composition which can be prepared as a relatively low viscosity liquid without a need for solvents, which is easy to handle, less hygroscopic, and able to form a film, and which cures into a product having improved dielectric properties including a large dielectric constant and a low dielectric loss.

We have found that an addition type curable composition comprising (A) an organopolysiloxane containing a cyanoalkyl group and a monovalent hydrocarbon group having an aliphatic unsaturated bond, (B) an organohydrogenpolysiloxane containing a cyanoalkyl group, and (C) a platinum group metal catalyst is liquid without a need for solvents, that is, can be prepared to a relatively low viscosity and is thus improved in handling. The composition is less hygroscopic and able to form a film, and cures into a product having improved dielectric properties including a large dielectric constant and a low dielectric loss.

The present invention provides a highly dielectric addition type curable composition comprising (A) an organopolysiloxane containing a cyanoalkyl group and a monovalent hydrocarbon group having an aliphatic unsaturated bond, (B) an organohydrogenpolysiloxane containing a cyanoalkyl group, and (C) a platinum group metal catalyst.

A preferred embodiment of the invention is a highly dielectric addition type curable composition comprising (A) an organopolysiloxane containing a cyanoalkyl group and a monovalent hydrocarbon group having an aliphatic unsaturated bond, represented by the average compositional formula (I):

$$R^1{}_a R^2{}_b R^3{}_c SiO_{(4+a+b+c)/2} \qquad (I)$$

wherein $R^1$ is a cyanoalkyl group having 3 to 5 carbon atoms, $R^2$ is a monovalent hydrocarbon group of 2 to 6 carbon atoms having an aliphatic unsaturated bond, $R^3$ is a monovalent hydrocarbon group having 1 to 10 carbon atoms other than $R^1$ and $R^2$, letter "a" is a number of 0.2 to 0.95, "b" is a number of 0.05 to 0.7, "c" is a number of 0.05 to 1.0, and a+b+c is 1.05 to 1.9, (B) an organohydrogenpolysiloxane containing a cyanoalkyl group, represented by the average compositional formula (II):

$$R^4{}_k R^5{}_m R^6{}_n SiO_{(4+k+m+n)/2} \qquad (II)$$

wherein $R^4$ is a cyanoalkyl group having 3 to 5 carbon atoms, $R^5$ is hydrogen, $R^6$ is a monovalent hydrocarbon group having 1 to 10 carbon atoms other than $R^4$, letter "k" is a number of 0.2 to 0.7, "m" is a number of 0.2 to 0.7, "n" is a number of 1.0 to 1.6, and k+m+n is 2.0 to 2.3, and (C) a platinum group metal catalyst.

DESCRIPTION OF THE PREFERRED EMBODIMENTS

For the highly dielectric addition type curable compositions of the invention, the presence of nitrile groups is essential. The organopolysiloxane (A) and the organohydrogenpolysiloxane (B) used herein must contain cyanoalkyl groups in their structural units. This is because highly polar nitrile groups are oriented and polarized in an electric field whereby dielectric constant is increased.

Component (A) is an organopolysiloxane containing a cyanoalkyl group and a monovalent hydrocarbon group having an aliphatic unsaturated bond, which is preferably represented by the average compositional formula (I) below.

$$R^1{}_a R^2{}_b R^3{}_c SiO_{(4+a+b+c)/2} \qquad (I)$$

Herein $R^1$ is a cyanoalkyl group having 3 to 5 carbon atoms, $R^2$ is a monovalent hydrocarbon group of 2 to 6 carbon atoms having an aliphatic unsaturated bond, $R^3$ is a monovalent hydrocarbon group having 1 to 10 carbon atoms other than $R^1$ and $R^2$, letter "a" is a number of 0.2 to 0.95, "b" is a number of 0.05 to 0.7, "c" is a number of 0.05 to 1.0, and a+b+c is 1.05 to 1.9.

Examples of the $C_3-C_5$ cyanoalkyl group represented by $R^1$ include cyanoethyl, cyanopropyl, cyanobutyl, 2-cyanopropyl, 2-cyanobutyl, 3-cyanobutyl, and 2-methyl-2-cyanopropyl. Of these, cyanoethyl is preferred.

Examples of the monovalent $C_2-C_6$ hydrocarbon group having an aliphatic unsaturated bond represented by $R^2$ include alkenyl groups such as vinyl and allyl, with vinyl being preferred.

$R^3$ is selected from substituted or unsubstituted monovalent hydrocarbon groups having 1 to 10 carbon atoms, preferably 1 to 8 carbon atoms, other than $R^1$ and $R^2$, for example, alkyl groups such as methyl, ethyl, propyl, isopropyl, butyl, isobutyl, tert-butyl, pentyl, neopentyl, hexyl and cyclohexyl, aryl groups such as phenyl, aralkyl groups such as benzyl and phenylethyl, and halogenated monovalent hydrocarbon groups such as chloromethyl, bromoethyl, 3,3,3-trifluoropropyl, 1,1,1-trifluorohexyl and 3-chloropropyl. Of these, methyl is preferred.

The letter "a" representative of the content of cyanoalkyl groups in the average compositional formula (I) is from 0.2 to 0.95, and preferably from 0.3 to 0.6. Too low a cyanoalkyl content leads to a lower concentration of nitrile groups in the polymer, which may lead to a reduced dielectric constant. With too high a cyanoalkyl content, the content of aliphatic unsaturation-bearing monovalent hydrocarbon groups (represented by "b") may be relatively reduced, resulting in insufficient cure.

The letter "b" representative of the content of aliphatic unsaturation-bearing monovalent hydrocarbon groups is from 0.05 to 0.7, and preferably from 0.3 to 0.6. Too low a content of aliphatic unsaturation-bearing monovalent hydrocarbon groups may lead to insufficient cure. With too high a content, the content of cyanoalkyl groups (represented by "a") may be relatively reduced, resulting in a lower concentration of nitrile groups in the polymer, which may lead to a reduced dielectric constant.

The letter "c" representative of the content of substituted or unsubstituted monovalent hydrocarbon groups other than $R^1$ and $R^2$ is from 0.05 to 1.0, and preferably from 0.6 to 0.9 because too high a content thereof may reduce the content of cyanoalkyl groups or aliphatic unsaturation-bearing monovalent hydrocarbon groups.

The sum of a+b+c, that is the total of cyanoalkyl groups, aliphatic unsaturation-bearing monovalent hydrocarbon groups, and substituted or unsubstituted monovalent hydrocarbon groups other than $R^1$ and $R^2$ in the average compositional formula (I), is from 1.05 to 1.9, and preferably from 1.5 to 1.8. If a+b+c is below the range, the organopolysiloxane may become a very brittle resin. If a+b+c is above the range, the composition may under-cure, precluding film formation.

In preparing the organopolysiloxane containing a cyanoalkyl group and a monovalent hydrocarbon group having an aliphatic unsaturated bond, represented by the average compositional formula (I), any conventional polysiloxane synthesis methods may be used, with no need to limit to a special method. Illustratively, the end product can be obtained by hydrolyzing a silane containing a cyanoalkyl group and a silane containing an aliphatic unsaturation-bearing monovalent hydrocarbon group to form siloxanes, followed by polymerization of the siloxanes or condensation reaction such as alcohol-removal or dehydration reaction.

The silanes, which are used as raw materials for the organopolysiloxane containing a cyanoalkyl group and a monovalent hydrocarbon group having an aliphatic unsaturated bond, should preferably further have at least one hydrolyzable functional group directly attached to a silicon atom. Such hydrolyzable functional groups include halogens, OR, OCOR and NRR' wherein R and R' are hydrogen or alkyl. The alkyl groups represented by R and R' are preferably those of 1 to 8 carbon atoms, more preferably 1 to 6 carbon atoms, for example, methyl, ethyl, propyl, isopropyl, butyl, isobutyl, tert-butyl, pentyl, neopentyl, hexyl and cyclohexyl.

Illustrative examples of the silane having a cyanoalkyl group include monofunctional silanes such as cyanoethyldimethylchlorosilane, cyanopropyldiethylmethoxysilane, cyanoethyldimethylacetoxysilane and dicyanoethylmethylmethoxysilane; difunctional silanes such as cyanoethylchloromethyldichlorosilane, cyanoethylmethyldimethoxysilane, cyanoethyltrifluoropropyldiethoxysilane and cyanopropylphenyldiaminosilane; and trifunctional silanes such as cyanoethyltriethoxysilane and cyanobutyltrimethoxysilane.

Illustrative examples of the silane containing an aliphatic unsaturation-bearing monovalent hydrocarbon group include vinyldimethylmethoxysilane, vinyldimethylethoxysilane, vinylmethyldichlorosilane, vinylmethyldimethoxysilane, vinyltrichlorosilane and vinyltrimethoxysilane.

Other silanes which do not contain a cyanoalkyl group and an aliphatic unsaturation-bearing monovalent hydrocarbon group may also be used as raw materials for the organopolysiloxane. Examples of the other silanes include monofunctional silanes such as trimethylchlorosilane, trimethylmethoxysilane, triethylaminosilane and hexamethyldisilazane; difunctional silanes such as dimethyldichlorosilane, methylphenyldichlorosilane, diphenyldichlorosilane, trifluoropropyldichlorosilane, dimethyldimethoxysilane and chloromethyldiethoxysilane; trifunctional silanes such as methyltrichlorosilane, trimethoxysilane, chloromethyltrimethoxysilane, phenyltrimethoxysilane and trifluoropropyltrimethoxysilane; and tetrafunctional silanes such as tetrachlorosilane, tetramethoxysilane and tetraethoxysilane.

Aside from the above-mentioned monomers, prepolymers obtained from such monomers are also useful as the starting reactant.

In the synthesis of the organopolysiloxane, various reaction catalysts and solvents may be used if necessary. Using such a catalyst and solvent, reaction may be carried out in a conventional well-known manner.

If silanol groups are left in the organopolysiloxane (A), the platinum group metal catalyst (C) may promote dehydrogenation reaction between the silanol groups and the organohydrogenpolysiloxane (B) to induce foaming. It is then recommended to previously cap the silanol groups in the organopolysiloxane (A) with a silylating agent such as hexamethyldisilazane.

The organopolysiloxane containing a cyanoalkyl group and a monovalent hydrocarbon group having an aliphatic unsaturated bond should preferably be liquid. Specifically, the organopolysiloxane should preferably have a viscosity of 500 to 50,000 centipoise (cP) at 25° C., and especially 1,000 to 20,000 cP at 25° C. If the organopolysiloxane is solid, it is dissolved in a solvent prior to use.

Component (B) is an organohydrogenpolysiloxane containing a cyanoalkyl group, which is preferably represented by the average compositional formula (II).

$$R^4_k R^5_m R^6_n SiO_{(4+k+m+n)/2} \tag{II}$$

Herein $R^4$ is a cyanoalkyl group having 3 to 5 carbon atoms, $R^5$ is hydrogen, $R^6$ is a monovalent hydrocarbon group having 1 to 10 carbon atoms other than $R^4$, letter "k" is a number of 0.2 to 0.7, "m" is a number of 0.2 to 0.7, "n" is a number of 1.0 to 1.6, and k+m+n is 2.0 to 2.3.

Examples of the $C_3$–$C_5$ cyanoalkyl group represented by $R^4$ include cyanoethyl, cyanopropyl, cyanobutyl, 2-cyanopropyl, 2-cyanobutyl, 3-cyanobutyl, and 2-methyl-2-cyanopropyl, as exemplified for $R^1$. Of these, cyanoethyl is preferred.

$R^6$ is selected from substituted or unsubstituted monovalent hydrocarbon groups having 1 to 10 carbon atoms, preferably 1 to 8 carbon atoms, other than $R^4$, preferably free of aliphatic unsaturation, for example, alkyl groups such as methyl, ethyl, propyl, isopropyl, butyl, isobutyl, tert-butyl, pentyl, neopentyl, hexyl and cyclohexyl, aryl groups such as phenyl, aralkyl groups such as benzyl and phenylethyl, and halogenated monovalent hydrocarbon groups such as chloromethyl, bromoethyl, 3,3,3-trifluoropropyl, 1,1,1-trifluorohexyl and 3-chloropropyl. Of these, methyl, ethyl, propyl and phenyl are preferred, with methyl being most preferred.

The letter "k" representative of the content of cyanoalkyl groups in the average compositional formula (II) is from 0.2 to 0.7, and preferably from 0.3 to 0.6. Too low a cyanoalkyl content leads to a lower concentration of nitrile groups in the polymer, which may lead to a reduced dielectric constant. Another potential problem is that the organohydrogenpolysiloxane with a lower cyanoalkyl content becomes less compatible with the organopolysiloxane containing a cyanoalkyl group and a monovalent hydrocarbon group having an aliphatic unsaturated bond (A), leading to insufficient cure or failing to produce uniformly cured parts. With too high a cyanoalkyl content, the content of hydrogen atoms (represented by "m") may be relatively reduced, resulting in insufficient cure.

The letter "m" representative of the content of hydrogen atoms (i.e., SiH groups) is from 0.2 to 0.7, preferably from 0.3 to 0.6. A hydrogen content below the range may lead to insufficient cure. With too high a hydrogen content, the content of cyanoalkyl groups (represented by "k") may be relatively reduced to thereby lower the concentration of nitrile groups in the polymer, which may lead to a reduced dielectric constant. In addition, the composition may encounter a foaming phenomenon by hydrogen gas.

The letter "n" representative of the content of substituted or unsubstituted monovalent hydrocarbon groups is from 1.0 to 1.6, preferably from 1.0 to 1.2. A too large value of n may lead to a reduced content of cyanoalkyl groups or hydrogen atoms (SiH groups).

The sum of k+m+n in the average compositional formula (II) is from 2.0 to 2.3, preferably from 2.0 to 2.1. If k+m+n is below the range, the organohydrogenpolysiloxane may become age unstable and the cured product become very brittle and impractical. If k+m+n is above the range, the composition may under-cure, precluding film formation.

In preparing the organohydrogenpolysiloxane having a cyanoalkyl group, represented by the average compositional formula (II), any conventional organohydrogenpolysiloxane synthesis methods may be used, with no need to limit to a special method. Illustratively, the end product can be obtained by effecting equilibration reaction between a cyanoalkyl group-containing organopolysiloxane and an organohydrogenpolysiloxane in the presence of a strong acid such as sulfuric acid or trifluoromethanesulfonic acid. By adding a terminal group-providing compound such as hexamethyldisiloxane during the equilibration reaction, the type of terminal functional group and the degree of polymerization can be adjusted in accordance with the type and amount of the compound.

The silanes, which are used as raw materials for the organohydrogenpolysiloxane containing a cyanoalkyl group, should preferably further have at least one hydrolyzable functional group directly attached to a silicon atom. Such hydrolyzable functional groups include halogens, OR, OCOR and NRR' wherein R and R' are hydrogen or alkyl as defined above.

The silanes used as the raw materials include silanes having a cyanoalkyl group, examples of which include monofunctional silanes such as cyanoethyldimethylchlorosilane, cyanopropyldiethylmethoxysilane, cyanoethyldimethylacetoxysilane and dicyanoethylmethylmethoxysilane; difunctional silanes such as cyanoethylchloromethyldichlorosilane, cyanoethylmethyldimethoxysilane, cyanoethyltrifluoropropyldiethoxysilane and cyanopropylphenyldiaminosilane; and trifunctional silanes such as cyanoethyltriethoxysilane and cyanobutyltrimethoxysilane. Of these, the difunctional silanes are preferred. In the equilibration reaction, prepolymers obtained from the above-mentioned monomers are preferably used.

Examples of the silane having a SiH group used as the raw material for the organohydrogenpolysiloxane include methylhydrogensilicone fluid and tetramethyltetrasiloxane.

Exemplary of the terminal group-providing compound are hexamethyldisiloxane and tetramethyldisiloxane. If necessary, cyclic organopolysiloxanes such as octamethyltetrasiloxane may be used.

The hydrogenpolysiloxane having a cyanoalkyl group should preferably have a viscosity of 300 to 50,000 cP at 25° C., more preferably 500 to 10,000 cP at 25° C.

Components (A) and (B) are blended in such amounts that 0.5 to 4, especially 0.7 to 1.2 hydrogen atoms directly attached to silicon atoms (i.e., SiH groups) in component (B) are available per aliphatic unsaturated bond, typically alkenyl group, in component (A). Less SiH groups may lead to insufficient cure whereas excessive SiH groups may allow hydrogen gas to provoke a foaming phenomenon.

The platinum group metal catalyst (C) may be any of well-known catalysts customarily used in hydrosilylation. Often, platinum and platinum compounds are used. Typical examples include chloroplatinic acid, alcohol solutions of chloroplatinic acid, the reaction products of chloroplatinic acid with alcohols, the reaction products of chloroplatinic acid with olefins, and the reaction products of chloroplatinic acid with vinyl-containing siloxanes.

The platinum group metal catalyst is used in a catalytic amount which may be adjusted in accordance with a desired cure rate. From the economic standpoint or to provide effective cure, the catalyst is preferably used in such amounts as to provide 1 to 10,000 parts, especially 10 to 7,000 parts by weight of platinum group metal per million parts by weight of components (A) and (B) combined.

In the composition of the invention, reaction regulating agents, reinforcing agents, additives (e.g., pigments, parting agents, heat resistance modifiers, flow modifiers, anti-settling agents, adhesion modifiers, heat conductive fillers, and electrically conductive fillers), diluents and the like may be optionally blended as long as they do not compromise the objects of the invention.

The composition of the invention may be prepared by intimately mixing components (A) to (C) and optional components at room temperature. Mixing may be done in a conventional way.

The composition thus obtained is preferably liquid. It should preferably have a viscosity of 300 to 50,000 centipoise (cP) at 25° C., especially 500 to 20,000 cP at 25° C.

For curing, the composition may be heated at a temperature of 100° C. or higher, more preferably 100 to 150° C., for about 1 to 120 minutes. In general, the more the amount of component (C) used, the faster cures the composition.

The highly dielectric addition curable composition of the invention has many advantages. It is easy to handle because of a liquid state even in the absence of a solvent and a relatively low viscosity and effectively curable. It has an ability to form a tough clear film. The cured composition has a large dielectric constant, a low dielectric loss, and a low volume resistivity, as well as a low moisture absorption as compared with other cyanoethyl polymers, a high heat decomposition temperature and heat resistance. Because of these improvements, the composition is advantageously applicable in the electronic material field.

The compositions of the invention are suited for use in electric and electronic parts requiring a high dielectric constant, for example, as the binder in electroluminescent devices, the film material in capacitors, and other dielectric materials. The compositions, combined with various electrically conductive fillers, find use as antistatic materials, electrostatic dissipating materials and electric conductive materials requiring a low volume resistivity. Additionally, the compositions can be utilized in general applications to form films, sheets, coatings and foams.

EXAMPLE

Examples of the invention are given below by way of illustration and not by way of limitation.

Example 1

Synthesis of Component (A)

A 1-liter glass reactor equipped with a stirrer, reflux condenser and thermometer was charged with 230 g of water and 36% aqueous hydrochloric acid. With stirring, a mixture of 119.4 g (0.55 mol) of cyanoethyltriethoxysilane, 8.0 g (0.05 mol) of cyanoethylmethyldimethoxysilane and 52.8 g (0.4 mol) of vinylmethyldimethoxysilane was admitted into the reactor. The reactor was heated and held at 60 to 70° C. to effect hydrolysis for 3 hours. With an ester adapter attached to the reactor, 106 g of the alcohol formed was distilled off. After cooling, 250 g of methyl isobutyl ketone was added to the residue, the aqueous layer was separated off, and the organic layer was washed twice with 100 g of water until it became neutral. The organic layer was vacuum stripped, removing the water and methyl isobutyl ketone. The resin thus obtained contained 10% by weight of silicon atom-bonded OH (i.e., silanol). The resin was dissolved in 250 g of tetrahydrofuran, which was placed in a 1-liter glass reactor equipped with a stirrer, reflux condenser and thermometer. Then 56.4 g (0.35 mol) of hexamethyldisilazane was admitted into the reactor, which was heated and held at 60 to 70° C. to effect reaction for 3 hours. The tetrahydrofuran and unreacted hexamethyldisilazane were removed by vacuum stripping, yielding 101 g of an organopolysiloxane. This organopolysiloxane is represented by the average compositional formula (1):

$$R^1_a R^2_b R^3_c SiO_{(4-a-b-c)/2} \quad (1)$$

wherein $R^1$ is cyanoethyl, $R^2$ is vinyl, $R^3$ is methyl, a, b and c are shown in Table 1. It had a viscosity as reported in Table 1.

Synthesis of Component (B)

1) Synthesis of Prepolymer

A 1-liter glass reactor equipped with a stirrer, reflux condenser, thermometer and dropping funnel was charged with 640.8 g (4.0 mol) of cyanoethylmethyldimethoxysilane. With stirring at room temperature, 300 g of 0.1 N aqueous hydrochloric acid was added dropwise from the dropping funnel over 0.5 hour. The reactor was heated and held at 60 to 70° C. to effect hydrolysis for 3 hours. After cooling, 750 g of methyl isobutyl ketone was added to the reaction solution, the aqueous layer was separated off, and the organic layer was washed twice with 300 g of water until it became neutral. Vacuum stripping of the organic layer removed the water and methyl isobutyl ketone, leaving 448 g of a prepolymer.

2) Synthesis of Component (B)

A 0.5-liter glass reactor equipped with a stirrer, reflux condenser and thermometer was charged with 81.4 g of the prepolymer, 34.7 g of methylhydrogensilicone fluid and 2.9 g of hexamethyldisiloxane. With stirring, 3.6 g of methanesulfonic acid was added whereupon equilibration reaction was effected for 20 hours at room temperature. Water, 1.4 g, was added to the reaction solution, followed by reaction for a further 2 hours. The reaction solution was neutralized with 36 g of sodium hydrogen carbonate, 140 g of methyl isobutyl ketone and 36 g of sodium sulfate were added thereto, and the resulting salt was filtered off. Vacuum stripping of the filtrate removed the methyl isobutyl ketone, leaving 104 g of a hydrogenpolysiloxane. This hydrogenpolysiloxane is represented by the average compositional formula (2):

$$R^4_k R^5_m R^6_n SiO_{(4-k-m-n)/2} \quad (2)$$

wherein $R^4$ is cyanoethyl, $R^5$ is hydrogen, $R^6$ is methyl, k, m and n are shown in Table 1. It had a viscosity as reported in Table 1.

Preparation of Composition

A composition was prepared by blending 15 g of the above component (A) and 7.8 g of the above component (B) so as to give 0.77 silicon atom-bonded hydrogen atom in component (B) per vinyl group in component (A) and further with 0.075 g of reaction regulating agent Surfynol 61 (Nisshin Chemical Industry K.K.), adding 0.075 g of a 0.5% toluene solution of chloroplatinic acid and intimately mixing them.

Preparation of Cured Part

The composition was applied to a polycarbonate resin plate and heated at 100° C. for 30 minutes for addition curing. The outer appearance of the film and the substrate was observed. Separately, the composition was poured into a mold cavity of 100 mm square and 2 mm deep and heated at 100° C. for 30 minutes for addition curing, obtaining a cured film of 1 mm thick. The physical properties of this film were measured by the following methods. The results are shown in Table 1.

Measurement of Physical Properties i) Dielectric Properties

Using a dielectric loss automatic measuring instrument Model TR-1100 with a thermostat tank Model TO-19B (Ando Electric K.K.), the capacitance and conductance of the film were measured at 25° C. and 1 MHz. A dielectric constant and a dielectric dissipation factor were calculated therefrom.

ii) Volume Resistivity

It was measured using R8340A Ultra High Resistance Meter, Sample Ahamber Model TR42 (Advantest Corp.).

iii) Moisture Absorption

After the film was dried at 120° C. for 2 hours, it was allowed to stand in a constant humidity tank at 25° C. and RH 75% for one week. A percent moisture absorption was calculated from the weight change.

iv) Heat Decomposition Temperature

Differential thermal analysis was carried out at a heating rate of 10° C./min and in an air stream. The temperature at which a weight loss begins is the heat decomposition temperature.

Example 2

Synthesis of Component (B)

The procedure of Example 1 was repeated except that the amounts of the prepolymer and methylhydrogensilicone fluid were changed to 79 g and 31.4 g, respectively, and 9.3 g of tetramethyltetracyclosiloxane was used instead of hexamethyldisiloxane. There was obtained 113 g of a hydrogenpolysiloxane. This hydrogenpolysiloxane is represented by the average compositional formula (2) wherein k, m and n are shown in Table 1. It had a viscosity as reported in Table 1.

Preparation of Composition and Measurement of Cured Physical Properties

A composition was prepared as in Example 1 except that 15 g of component (A) in Example 1 and 6.8 g of the above component (B) were used. The composition was similarly cured into a film, which was measured for physical properties. The results are also shown in Table 1.

Example 3

Synthesis of Component (A)

The procedure of Example 1 was repeated except that the amounts of the cyanoethyltriethoxysilane, cyanoethylmethyldimethoxysilane and vinylmethyldimethoxysilane were changed to 86.8 g (0.4 mol), 0 g and 79.2 g (0.6 mol), respectively. There was obtained 98 g of an organopolysiloxane. This organopolysiloxane is represented by the average compositional formula (1) wherein a, b and c are shown in Table 1. It had a viscosity as reported in Table 1.

Preparation of Composition and Measurement of Cured Physical Properties

A composition was prepared as in Example 1 except that 15 g of the above component (A) and 9.9 g of component (B) in Example 2 were used. The composition was similarly cured into a film, which was measured for physical properties. The results are also shown in Table 1.

Example 4

Synthesis of Component (A)

The procedure of Example 1 was repeated except that the amounts of the cyanoethyltriethoxysilane, cyanoethylmethyldimethoxysilane and vinylmethyldimethoxysilane were changed to 21.7 g (0.1 mol), 0 g and 118.8 g (0.9 mol), respectively. There was obtained 99 g of an organopolysiloxane. This organopolysiloxane is represented by the average compositional formula (1) wherein a, b and c are shown in Table 1. It had a viscosity as reported in Table 1.

Preparation of Composition and Measurement of Cured Physical Properties

A composition was prepared as in Example 1 except that 15 g of the above component (A) and 21.9 g of component (B) in Example 1 were used. The composition was similarly cured into a film, which was measured for physical properties. The results are also shown in Table 1.

Comparative Examples 1 and 2

Using acetone solutions of cyanoethylorganopolysiloxane synthesized according to JP-B 6-97571 (Comparative Example 1) and cyanoethyl cellulose (Acrylocell by TEL SYSTEMS INC.) (Comparative Example 2), which were normally semi-solid or solid, films were formed as in Example 1. The films were similarly tested, with the results shown in Table 1.

TABLE 1

|  | Example | | | | Comparative Example | |
| --- | --- | --- | --- | --- | --- | --- |
|  | 1 | 2 | 3 | 4 | 1 | 2 |
| Component (A) | | | | | | |
| a | 0.55 | 0.55 | 0.36 | 0.09 | 1.00 | Cyanoethyl |
| b | 0.36 | 0.36 | 0.55 | 0.82 | 0 | cellulose |
| c | 0.68 | 0.68 | 0.82 | 1.09 | 0.3 | |
| a + b + c | 1.59 | 1.59 | 1.73 | 2.00 | 1.3 | |
| Viscosity (cP) | 9200 | 9200 | 2300 | 1200 | Unmeasurable | Unmeasurable |
| Component (B) | | | | | | |
| k | 0.55 | 0.48 | 0.48 | 0.55 | — | — |
| m | 0.40 | 0.50 | 0.50 | 0.40 | — | — |
| n | 1.10 | 1.04 | 1.04 | 1.10 | — | — |
| k + m + n | 2.05 | 2.02 | 2.02 | 2.05 | — | — |
| Viscosity (cP) | 890 | 1800 | 1800 | 890 | | |
| Outer appearance | Good | Good | Good | Good | substrate whitened | substrate whitened |
| Dielectric constant | 12 | 11 | 8 | 6 | 25 | 15 |
| Dielectric dissipation factor | 0.037 | 0.044 | 0.037 | 0.031 | 0.045 | 0.036 |
| Volume resistivity (Ωcm) | $1.1 \times 10^{10}$ | $1.6 \times 10^{9}$ | $9.9 \times 10^{8}$ | $3.5 \times 10^{13}$ | $2.9 \times 10^{10}$ | — |
| Moisture absorption (wt %) | 0.9 | 1.1 | 1.1 | 1.6 | 1.3 | 5.0 |
| Heat decomposition temp. (° C.) | 280 | 290 | 290 | 290 | 350 | 250 |

There has been described a highly dielectric addition curable composition which is easy to handle because of liquid despite solvent-free, less hygroscopic and effectively curable, and has a film-forming ability. The cured composition has excellent dielectric properties as demonstrated by a large dielectric constant and a low dielectric loss.

Japanese Patent Application No. 2001-071761 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A highly dielectric addition type curable composition comprising (A) an organopolysiloxane having the average compositional formula (I):

$$R^1_a R^2_b R^3_c SiO_{(4+a+b+c)/2} \quad (I)$$

wherein $R^1$ is a cyanoalkyl group having 3 to 5 carbon atoms, $R^2$ is a monavalent hydrocarbon group of 2 to 6 carbon atoms having an aliphatic unsaturated bond, $R^3$ is a monovalent hydrocarbon group having 1 to 10 carbon atoms other than $R^1$ and $R^2$, letter "a" is a number of 0.2 to 0.95, "b" is a number of 0.05 to 0.7, "c" is a number of 0.5 to 1.0, and a+b+c is 1.05 to 1.9, (B) an organohydrogenpolysiloxane having the average compositional formula (II):

$$R^4_k R^5_m R^6_n SiO_{(4+k+m+n)/2} \quad (II)$$

wherein $R^4$ is a cyanoalkyl group having 3 to 5 carbon atoms, $R^5$ is hydrogen, $R^6$ is a monovalent hydrocarbon group having 1 to 10 carbon atoms other than $R^4$, letter "k" is a number of 0.2 to 0.7, "m" is a number of 0.2 to 0.7, "n" is a number of 1.0 to 1.6, and k+m+n is 2.0 to 2.3, and (C) a platinum group metal catalyst.

2. The curable composition of claim 1 wherein silanol groups left in the organopolysiloxane (A) is capped with a silylating agent.

3. The curable composition of claim 1, wherein a+b+c in the average compositional formula (I) is 1.5 to 1.8.

4. The curable composition of claim 1, wherein the organopolysiloxane (A) is obtained by hydrolyzing a silane containing a cyanoalkyl group and a silane containing an aliphatic unstaturation-bearing monovalent hydrocarbon group to form siloxanes, followed by a polymerization or condensation reaction.

5. The curable composition of claim 1, wherein the organopolysiloxane (A) has a viscosity 500 to 50,000 centipoise at 25° C. and the organohydrogenpolysiloxane (B) has a viscosity of 300 to 50,000 centipoise at 25° C., and the composition is liquid and has a viscosity of 300 to 50,000 centipoise at 25° C.

6. A highly dielectric addition type curable composition consisting essentially of (A) an organopolysiloxane having the average compositional formula (I):

$$R^1_a R^2_b R^3_c SiO_{(4+a+b+c)/2} \quad (I)$$

wherein $R^1$ is a cyanoalkyl group having 3 to 5 carbon atoms, $R^2$ is a monavalent hydrocarbon group of 2 to 6 carbon atoms having an aliphatic unsaturated bond, $R^3$ is a monovalent hydrocarbon group having 1 to 10 carbon atoms other than $R^1$ and $R^2$, "a" is a number of 0.2 to 0.95, "b" is a number of 0.05 to 0.07, "c" is a number of 0.05 to 1.0, and a+b+c is 1.05 to 1.9, (B) an organohydrogenpolysiloxane having the average compositional formula (II):

$$R^4_k R^5_m R^6_n SiO_{(4+k+m+n)/2} \quad (II)$$

wherein $R^4$ is a cyanoalkyl group having 3 to 5 carbon atoms, $R^5$ is hydrogen, $R^6$ is a monovalent hydrocarbon group having 1 to 10 carbon atoms other than $R^4$, "k" is a number of 0.2 to 0.7, "m" is a number of 0.2 to 0.7, "n" is a number of 1.0 to 1.6, and k+m+n is 2.0 to 2.3, and (C) a platinum group metal catalyst.

* * * * *